N. BARNES.
Cultivator.

No. 1,779. Patented Sept. 10, 1840.

UNITED STATES PATENT OFFICE.

NOAH BARNES, OF EAST HAMPTON, NEW YORK.

IMPROVEMENT IN CULTIVATORS.

Specification forming part of Letters Patent No. 1,779, dated September 10, 1840.

*To all whom it may concern:*

Be it known that I, NOAH BARNES, of East Hampton, in the county of Suffolk and State of New York, have invented a new and useful Improvement in Machines for Cultivating Corn and other Crops Planted in Rows or Drills, which is described as follows, reference being had to the annexed drawings of the same, making part of this specification.

Figure 1:
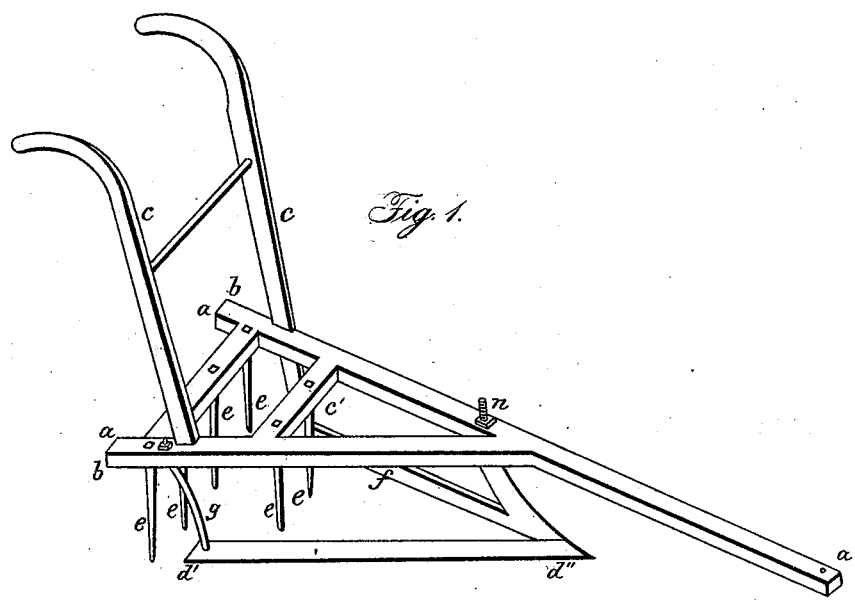
Figure 2:
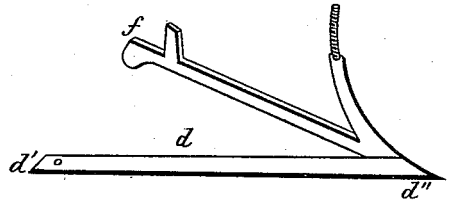

Figure 1 is a perspective view of the instrument. Fig. 2 is a view of the share and landside detached from the frames.

Similar letters refer to similar parts in the figures.

Construct a frame, $a\ a$, of suitable size and strength—say about four feet long and in width from $b$ to $b$ according to the distance apart of the rows of corn, &c., to be dropped—furnished with handles $c\ c$ of the usual form, and a share, $d$, made of iron or steel, the cutting-edge $d'\ d''$ being made thin and sharp and secured by welding it to the point of the landside $f$, which is extended up in front in the manner of a colter or cutter and passed through the frame and secured by a nut, $u$, on the upper end thereof, and by a connecting-bolt, $g$, attached to the wing of the share and the wide part of the frame, the heel of the landside or land-bar being fastened to the left handle, $c$, which is extended down below the frame for that purpose. The share is about the length of the frame and about three inches wide, and of equal width throughout the entire length, and where its cutting-edge touches the ground or a horizontal plane its under side rises therefrom at any suitable angle. The heel of the land-bar at $f'$ is made to drop below the under side thereof a small part of its length, where it is made sharp, so as to cut vertically. A row of harrow-teeth, $e$, is inserted into each cross-piece of the frame in such manner that the teeth of the forward row shall come opposite the spaces between the teeth in the hind row.

The share and land-bar can be removed from the frame at any time for the purpose of sharpening whenever required.

This agricultural implement is to be used between the rows of the crop by driving near the left row, while the share extends nearly to the row on the right, by which the roots of weeds are cut as the share passes along through the ground, while the cutter on the land-bar cuts vertically, and the harrow-teeth, following immediately thereafter, break up and level the ground and separate the roots, weeds, &c., therefrom and leave it in a proper state.

What I claim as my invention, and desire to secure by Letters Patent, consists in—

The before-described combination of the share, teeth, and frame for dressing crops planted in rows, as herein set forth.

NOAH BARNES.

Witnesses:
ABEL HUNTINGTON,
DAVID HEDGES, Jr.